United States Patent
Matsuhira

(10) Patent No.: US 9,317,431 B2
(45) Date of Patent: Apr. 19, 2016

(54) ADDRESS GENERATOR, ADDRESS GENERATION METHOD, AND ENCAPSULATION-DECAPSULATION DEVICE

(71) Applicant: FUJITSU LIMITED, Kawasaki-shi, Kanagawa (JP)

(72) Inventor: Naoki Matsuhira, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 242 days.

(21) Appl. No.: 14/098,623

(22) Filed: Dec. 6, 2013

(65) Prior Publication Data
US 2014/0215179 A1 Jul. 31, 2014

(30) Foreign Application Priority Data
Jan. 31, 2013 (JP) .................................. 2013-017227

(51) Int. Cl.
*G06F 12/08* (2006.01)
*G06F 12/10* (2006.01)
*H04L 12/46* (2006.01)
*H04L 29/06* (2006.01)
*H04L 29/12* (2006.01)

(52) U.S. Cl.
CPC ........ *G06F 12/0813* (2013.01); *G06F 12/1009* (2013.01); *H04L 12/4633* (2013.01); *H04L 61/6004* (2013.01); *H04L 69/167* (2013.01); H04L 61/6059 (2013.01); H04L 61/6068 (2013.01)

(58) Field of Classification Search
CPC ............ G06F 12/0813; G06F 12/1009; H04L 12/4633; H04L 29/06; H04L 45/00; H04L 61/6004; H04L 61/6059; H04L 61/6068; H04L 69/167
USPC ........................................................ 711/211
See application file for complete search history.

(56) References Cited

U.S. PATENT DOCUMENTS

| | | | | |
|---|---|---|---|---|
| 2003/0088697 | A1* | 5/2003 | Matsuhira | H04L 12/4604 709/238 |
| 2006/0034209 | A1* | 2/2006 | O'Neill | H04W 8/12 370/328 |
| 2011/0310898 | A1* | 12/2011 | Alkhatib | H04L 29/12358 370/392 |

FOREIGN PATENT DOCUMENTS

| | | |
|---|---|---|
| WO | 01/99354 | 12/2001 |
| WO | WO 0199354 A1 * | 12/2001 |

\* cited by examiner

*Primary Examiner* — Yong Choe
(74) *Attorney, Agent, or Firm* — Staas & Halsey LLP

(57) ABSTRACT

An address generator includes a storage device in which one or more second-protocol-family address prefixes are stored, the one or more second-protocol-family address prefixes each corresponding to a corresponding combination of at least a multiplexing identifier and a first-protocol-family address, and a controller configured to read, from the storage device, the second-protocol-family address prefix corresponding to a combination of at least the multiplexing identifier and the first-protocol-family address that is contained in a data block to be transferred via a backbone network to a destination network which uses the first protocol family, the read second-protocol-family address prefix serving as an address prefix for a network that is overlaid with the destination network, and configured to generate a second-protocol-family address containing the first-protocol-family address, the multiplexing identifier, and the read second-protocol-family address prefix, the generated second-protocol-family address serving as a destination address within the backbone network.

8 Claims, 13 Drawing Sheets

ADDRESS GENERATOR, ADDRESS GENERATION METHOD, AND ENCAPSULATION-DECAPSULATION DEVICE

CROSS-REFERENCE TO RELATED APPLICATION

This application is based upon and claims the benefit of priority of the prior Japanese Patent Application No. 2013-017227, filed on Jan. 31, 2013, the entire contents of which are incorporated herein by reference.

FIELD

The embodiments discussed herein are related to an address generator, an address generation method, and an encapsulation-decapsulation device.

BACKGROUND

The Internet and Internet Protocol (IP) networks use Internet Protocol version 4 (IPv4) or Internet Protocol version 6 (IPv6). These networks are networks that employ the IP for layer 3, that is, the network layer, of the Open Systems Interconnection (OSI) reference model. Ethernet (registered trademark) is a protocol that handles layer 2, that is, the data link layer, of the OSI reference model.

In general, for the aforementioned networks, there exists a technique that allows a certain network to be overlaid with a different network. For example, an IPv4-based service is implemented over an IPv6 network by using the IPv4 over IPv6 technique. Also, for example, implementation of an Ethernet-based service over an IPv6 network is also conceivable.

Such services are advantageous in that IPv4-based or Ethernet-based services are implemented in an available range of an IPv6. The absence of such an overlay technique results in construction of new infrastructure without utilizing an existing one, which is uneconomical.

The following is an example of a network system that uses the aforementioned overlay technique. For example, multiple IPv6 networks which are stub networks are connected to an IPv6 network which is a backbone network. Further, each stub network is overlaid with a corresponding IPv4 network.

In the case where an IPv4 packet is transferred from a certain IPv4 network to another IPv4 network in such a network system, an encapsulation-decapsulation device disposed at the boundary of the certain IPv4 network and the backbone IPv6 network encapsulates the IPv4 packet in an IPv6 packet and the resulting IPv6 packet is transferred within the backbone IPv6 network. The IPv6 packet is then received by another encapsulation-decapsulation device disposed at the boundary of the other IPv4 network and the backbone IPv6 network and the IPv4 packet extracted from the IPv6 packet is transferred to the other IPv4 network.

The related art is described, for example, in International Publication Pamphlet No. WO2001/099354.

SUMMARY

According to an aspect of the invention, an address generator includes a storage device in which one or more second-protocol-family address prefixes based on a second protocol family are stored, the one or more second-protocol-family address prefixes each corresponding to a corresponding combination of at least a multiplexing identifier and a first-protocol-family address based on a first protocol family, and a controller configured to read, from the storage device, the second-protocol-family address prefix corresponding to a combination of at least the multiplexing identifier and the first-protocol-family address that is contained in a data block to be transferred via a backbone network to a destination network which uses the first protocol family, the read second-protocol-family address prefix serving as an address prefix for a network that is overlaid with the destination network, and configured to generate a second-protocol-family address containing the first-protocol-family address, the multiplexing identifier, and the read second-protocol-family address prefix, the generated second-protocol-family address serving as a destination address within the backbone network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A technique that may suppress an increase in the number of paths in a backbone network will be described below with reference to the accompanying drawings. Configurations of embodiments below are merely illustrative and the present disclosure is not limited to the configurations of the embodiments.

First Embodiment

<Example of Configuration of Network System>

Figure 1:
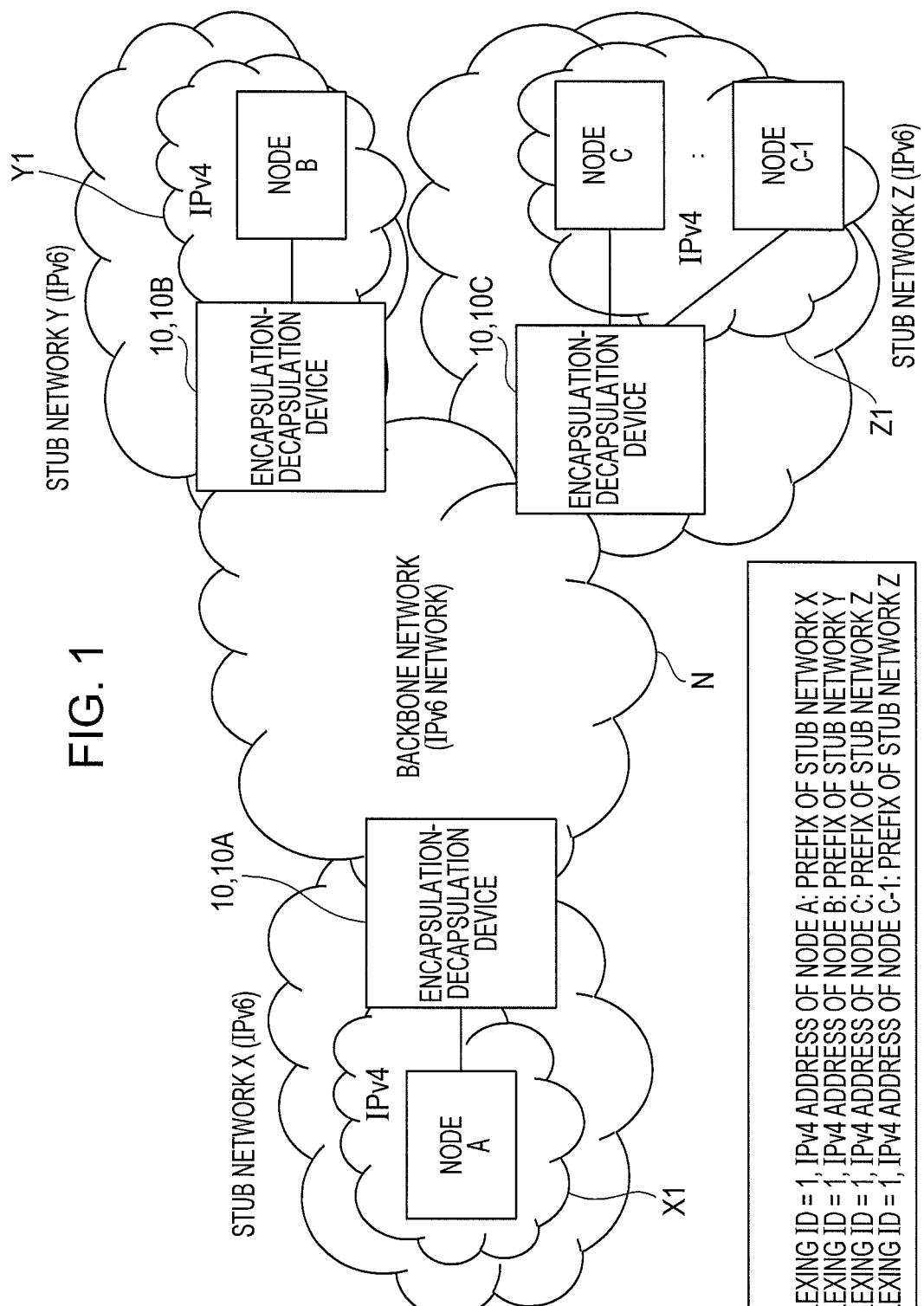
FIG. 1 illustrates an example of the configuration of a network system which employs encapsulation-decapsulation devices (address generators) according to embodiments.

FIG. 1 illustrates an example of the configuration of a network system according to a first embodiment. The example illustrated in FIG. 1 depicts a network system in which multiple stub networks X, Y, and Z, which are multiple stub IPv6 networks, are connected to a backbone network (BB network) N, which is an IPv6 network. Different address prefixes are set for the respective stub networks X, Y, and Z.

The stub networks X, Y, and Z are overlaid with IPv4 networks X1, Y1, and Z1, respectively. The IPv4 networks X1, Y1, and Z1 are an example of multiple stub networks. IPv4 is an example of a first protocol family, whereas IPv6 is an example of a second protocol family.

A node A that uses IPv4 belongs to the IPv4 network X1. A node B that uses IPv4 belongs to the IPv4 network Y1. Nodes C and C-1 that use IPv4 belong to the IPv4 network Z1. Each node may be, for example, a host (such as a terminal device or server device) or relay device (such as a router or switch) that performs communication using IPv4.

Encapsulation-decapsulation devices 10A, 10B, and 10C (also collectively referred to as encapsulation-decapsulation devices 10 in the case where the encapsulation-decapsulation devices are not distinguished) are disposed at boundaries between the stub networks X, Y, and Z and the backbone network N, respectively. Each of the encapsulation-decapsulation devices 10A, 10B, and 10C includes an address generator.

Each of the encapsulation-decapsulation devices 10A, 10B, and 10C may accommodate one or more nodes. In the example illustrated in FIG. 1, the encapsulation-decapsulation device 10A is connected to the node A, the encapsulation-decapsulation device 10B is connected to the node B, and the encapsulation-decapsulation device 10C is connected to the nodes C and C-1. There may be one or more relay devices between each node and a corresponding encapsulation-decapsulation device.

A given number of stub networks (IPv6) that are overlaid with respective IPv4 networks and a given number of encapsulation-decapsulation devices may be set. The backbone network N includes one or more relay devices that connect the encapsulation-decapsulation devices 10A, 10B, and 10C to one another.

In the case where a certain node (for example, the node A) transmits an IPv4 packet addressed to another node (for example, the node B), the IPv4 packet is transmitted from the node A and is received by the encapsulation-decapsulation device 10A. The encapsulation-decapsulation device 10A generates an IPv6 address, which is a destination address of the IPv4 packet in the backbone network N; encapsulates the IPv4 packet with an IPv6 header containing the generated IPv6 address; and sends out the resulting IPv6 packet to the backbone network N.

The IPv6 packet arrives at the encapsulation-decapsulation device 10B, which is the destination, directly or via one or more relay devices. The encapsulation-decapsulation device 10B removes the IPv6 header so as to extract the IPv4 packet (decapsulation), and transfers the resulting IPv4 packet to the node B. In the case where an IPv4 packet is transferred from the node B to the node A, the opposite operation of the above operation is performed. Note that the similar operation is performed between other nodes.

<Generation of Address>

Each encapsulation-decapsulation device 10 generates an IPv6 address in order to transfer, via the backbone network N, an IPv4 packet which is received from a node belonging thereto and is addressed to another node, to an IPv4 network to which the other node belongs. The IPv4 packet is an example of a data block. The IPv4 packet contains a source IPv4 address, a destination IPv4 address, a source port number, and a destination port number.

Figure 2:
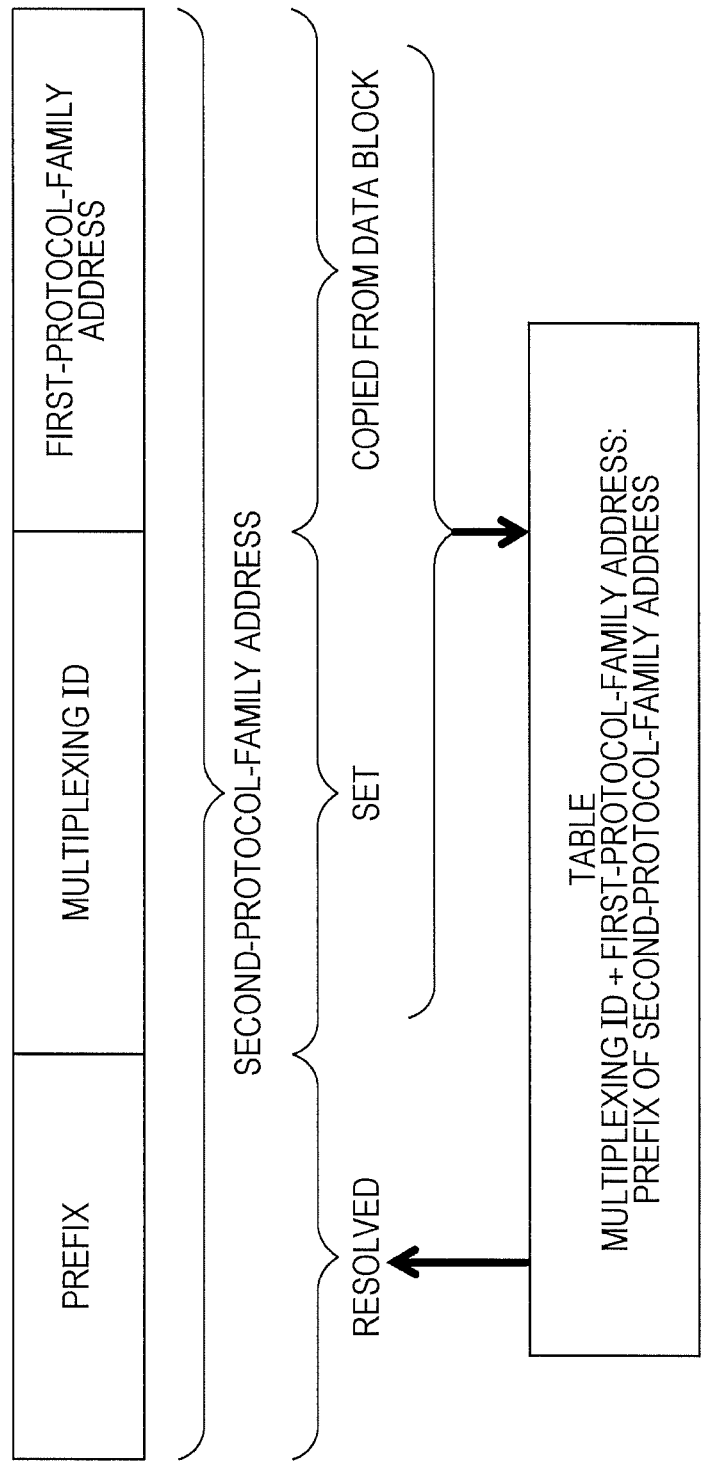
FIG. 2 is an explanatory diagram of how an address is generated in the embodiments.

FIG. 2 is an explanatory diagram of how an address is generated in the embodiments. Referring to FIG. 2, an address based on a second protocol family (hereinafter, referred to as a second-protocol-family address) is generated from a combination of a prefix, a multiplexing identifier (hereinafter, referred to as multiplexing ID), and an address based on a first protocol family (hereinafter, referred to as a first-protocol-family address).

The first-protocol-family address may be obtained from a data block (packet) received from a node. The multiplexing ID is preset (stored) in the encapsulation-decapsulation device 10. The prefix is a prefix of the second-protocol-family address and may be determined from a table stored in the encapsulation-decapsulation device 10.

The table is searched using a combination of the multiplexing ID and the first-protocol-family address. As a result of the search, the prefix corresponding to the combination of the multiplexing ID and the first-protocol-family address is found. In this way, the prefix may be resolved using the table. Then, the encapsulation-decapsulation device 10 concatenates the prefix, the multiplexing ID, and the first-protocol-family address in a certain order so as to generate the second-protocol-family address.

Figure 3:
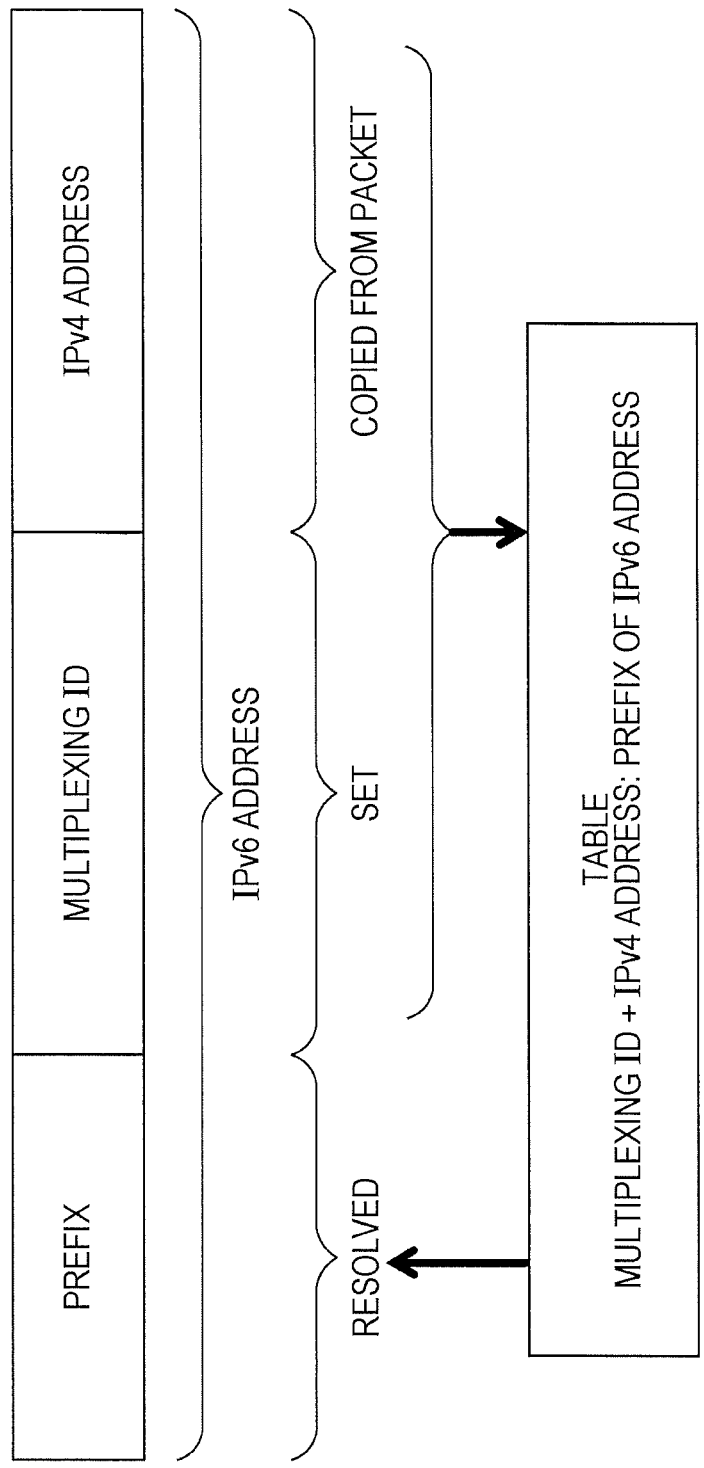
FIG. 3 is a diagram that illustrates the concept illustrated in FIG. 2, in accordance with a first embodiment.

FIG. 3 is a diagram that illustrates the concept illustrated in FIG. 2, in accordance with the first embodiment. As illustrated in FIG. 3, the first-protocol-family address is an IPv4 address, whereas the second-protocol-family address is an IPv6 address.

The encapsulation-decapsulation device 10 that has received an IPv4 packet uses, as an IPv4 address, a copy of the destination IPv4 address contained in the IPv4 packet. The table stores a prefix of an IPv6 network that is overlaid with a destination network (IPv4 network) of the IPv4 packet, the prefix corresponding to a combination of the multiplexing ID and the destination IPv4 address.

As illustrated in FIG. 1, a prefix of an IPv6 network that is overlaid with the IPv4 network Y1 to which the node B belongs, that is, a prefix of the stub network Y, is stored in the table in association with the combination of the multiplexing ID and the address of the node B, which is the destination IPv4 address. Similarly, a prefix of the stub network Z is stored in the table in association with the combination of the multiplexing ID and the address of the node C and the combination of the multiplexing ID and the address of the node C-1. Further, a prefix of the stub network X is stored in the table in association with the combination of the multiplexing ID and the address of the node A. The table having such entries is stored in each encapsulation-decapsulation device 10.

Accordingly, for example, in the case where the encapsulation-decapsulation device 10A receives an IPv4 packet addressed to the node B from the node A, the encapsulation-decapsulation device 10A copies the destination IPv4 address contained in the IPv4 packet. Then, the encapsulation-decapsulation device 10A searches the table for the prefix corresponding to the combination of the pre-stored multiplexing ID and the destination IPv4 address. As a result of the search, the prefix of the stub network Y is found.

The encapsulation-decapsulation device 10A concatenates the prefix, the multiplexing ID, and the destination IPv4 address in a certain order so as to generate an IPv6 address.

Then, the encapsulation-decapsulation device 10A encapsulates the IPv4 packet with a header containing the generated IPv6 address (IPv6 header in which the generated IPv6 address is set as the destination IPv6 address), and sends out the resulting IPv6 packet to the backbone network N. It is called an encapsulation to encapsulate the IPv4 packet with the header containing the generated IPv6 address.

The IPv6 address generated by the encapsulation-decapsulation device 10A in this way functions as a destination address in the backbone network N, that is, the address of the encapsulation-decapsulation device 10B that is connected to the IPv4 network Y1 which is the destination network. In the backbone network N, IPv6 prefixes of the respective stub networks X, Y, and Z are advertised and exchanged through static setting or a route exchange protocol.

Accordingly, the prefix of the destination IPv6 address contained in the IPv6 packet is treated as the address of the destination stub network (IPv6) by a relay device (for example, a router or layer-3 switch) within the backbone network N. In this way, the IPv6 packet arrives at the encapsulation-decapsulation device 10B which is the destination.

Note that as the route exchange protocol (routing protocol) for advertisement, for example, any one of Routing Information Protocol (RIP), Open Shortest Path First (OSPF), Intermediate System-Intermediate System (IS-IS), and Border Gateway Protocol (BGP) which support IPv6 may be employed.

The encapsulation-decapsulation device 10B removes the IPv6 header from the IPv6 packet so as to extract the IPv4 packet, and transmits the obtained IPv4 packet to the node B within the IPv4 network Y1. In this way, the node B is able to receive the IPv4 packet from the node A. It is called a decapsulation to remove the IPv6 header from the IPv6 packet so as to extract the IPv4 packet.

In the case where the encapsulation-decapsulation device 10B receives an IPv4 packet addressed to the node A and transmitted from the node B, the encapsulation-decapsulation device 10B reads the prefix of the stub network X from the table, and generates an IPv6 address on the basis of the destination IPv4 address (the IPv4 address of the node A), the multiplexing ID, and the read prefix. Then, an IPv6 packet obtained by encapsulating the IPv4 packet with a header containing the IPv6 address (IPv6 header in which the IPv6 address is set as the destination IPv6 address) is transferred to the encapsulation-decapsulation device 10A. Then, the encapsulation-decapsulation device 10A extracts the IPv4 packet, and transmits the obtained IPv4 packet to the node A.

<Multiplexing ID>

Figure 4:
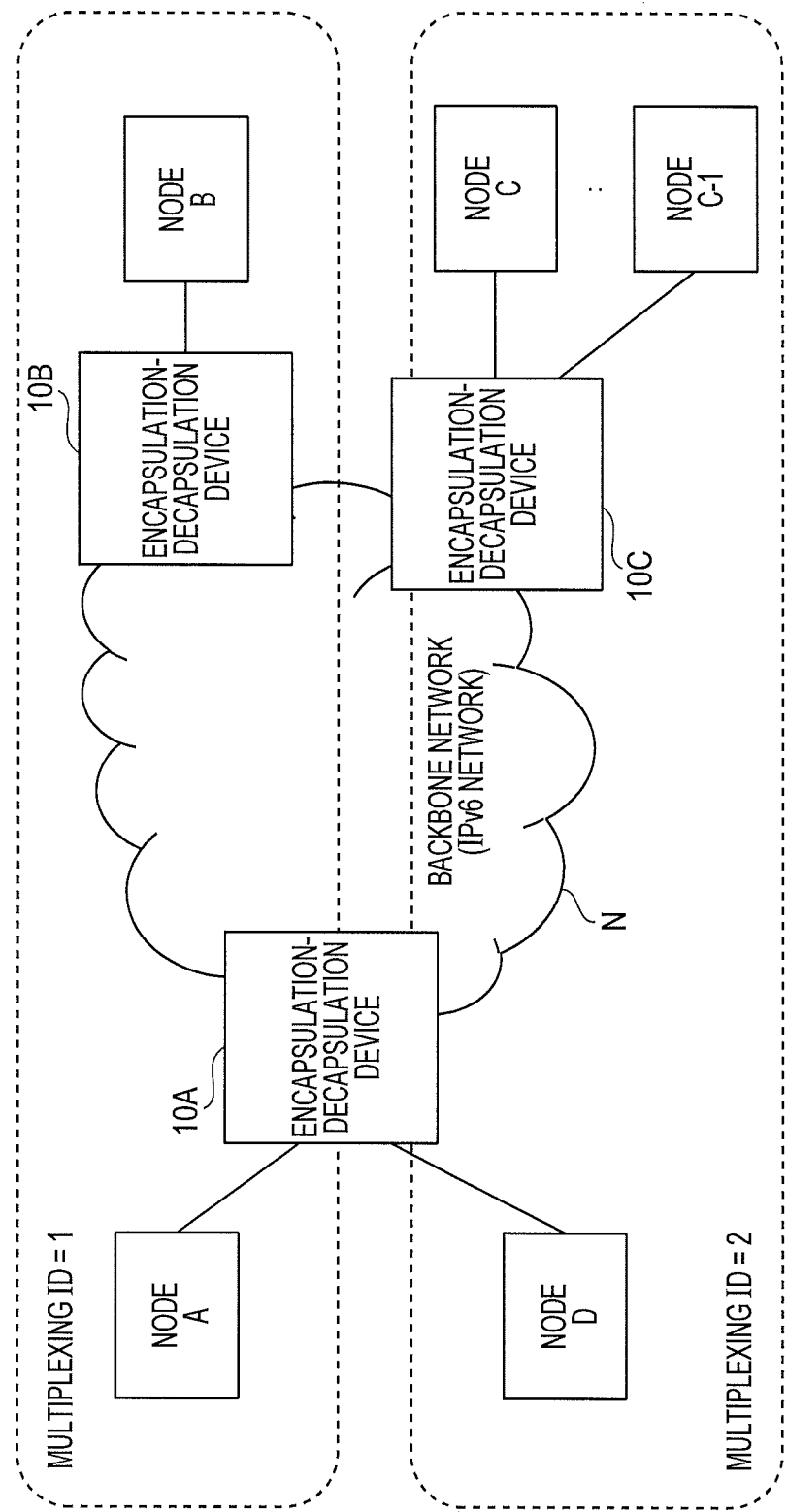
FIG. 4 is a diagram that illustrates a modification of the network system illustrated in FIG. 1 and an operation performed in the case where different multiplexing identifiers are used.

Now, functions related to the multiplexing ID will be described. In the network system illustrated in FIG. 1, the same multiplexing ID (ID="1") is used for all the nodes (all the IPv4 networks). However, the case where different multiplexing IDs are used will be described. FIG. 4 is a diagram that illustrates a modification of the network system illustrated in FIG. 1 and an operation performed in the case where different multiplexing IDs are used.

FIG. 4 depicts two areas enclosed by dashed lines. Each area forms a corresponding logical network. Specifically, the nodes A and B belong to a logical network identified by the multiplexing ID "1", whereas the nodes D, C, and C-1 belong to another logical network identified by the multiplexing ID "2". The node D is an IPv4 host, and an IPv4 network to which the node D belongs overlays a stub network (IPv6 network) that is different from the stub networks X, Y, and Z.

Typically, the multiplexing ID is set for each network interface of the encapsulation-decapsulation device 10. That is, by setting the multiplexing ID, a logical network to which a node connected to the network interface belongs is specified. Note that the multiplexing ID may be set for each encapsulation-decapsulation device 10, instead of for each interface, so as to specify a logical network to which nodes belong.

In the example illustrated in FIG. 4, the node A is represented by an address "the prefix+the multiplexing ID (="1")+the IPv4 address" in the IPv6 address space. The node B is represented by an address "the prefix+the multiplexing ID (="1")+the IPv4 address" in the IPv6 address space. In contrast, each of the nodes C and C-1 is represented by an address "the prefix+the multiplexing ID (="2")+the IPv4 address". The node D is represented by an address "the prefix+the multiplexing ID (="2")+the IPv4 address". Each of these addresses may be set in the corresponding encapsulation-decapsulation device 10 using the above-described method.

Packet communication is performed between the nodes A and B and between each pair of the nodes D, C, and C-1 through the operation similar to the above-described transfer operation. At this time, the packet is transferred via the same backbone network N (IPv6 network) regardless of the multiplexing IDs. That is, even in the case where the multiplexing IDs are different, one IPv6 network may be used. In this way, the use of multiplexing IDs allows multiple logical IPv4 networks to be constructed over an IPv6 network. In other words, multiple logical IPv4 networks may be constructed over one physical network. Accordingly, the encapsulation-decapsulation device 10 may function as a network multiplexer. Note that a common network address may be shared among IPv4 networks that use an identical multiplexing ID.

<Hardware Configuration of Encapsulation-Decapsulation Device>

Figure 5:
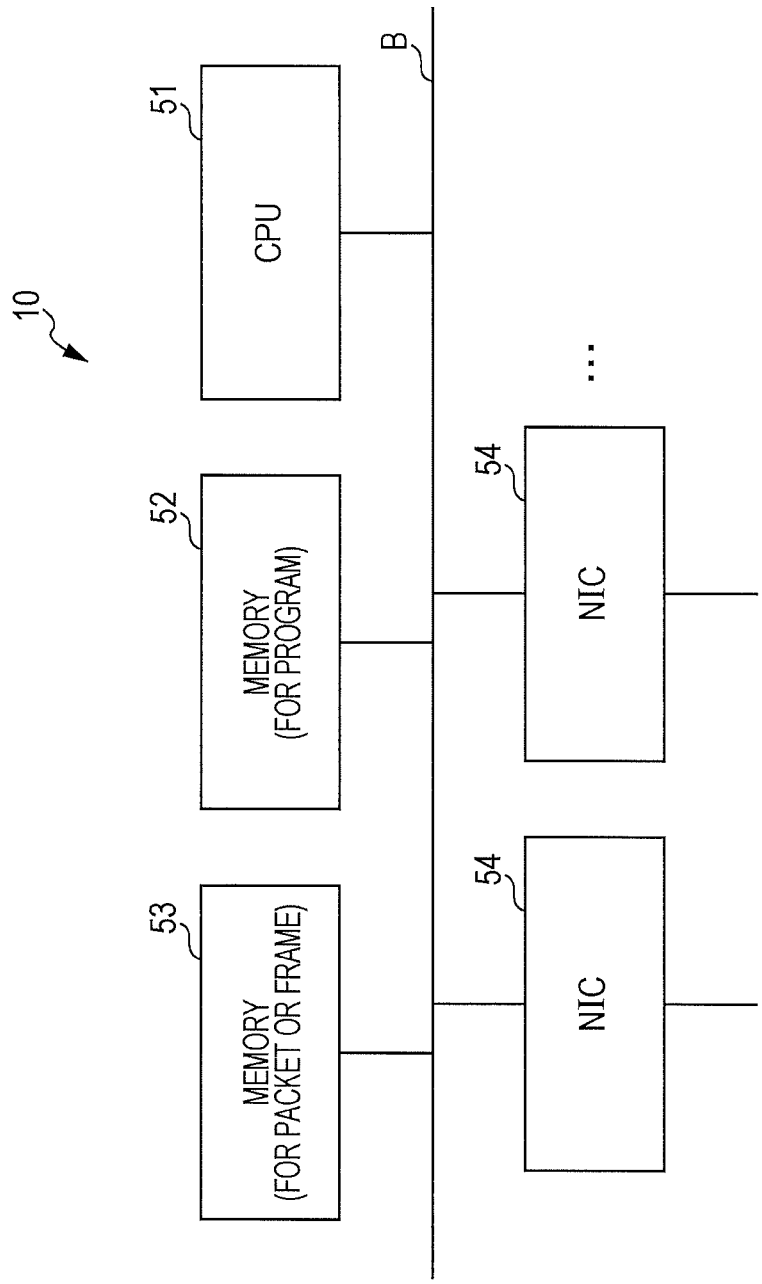
FIG. 5 illustrates an example of the hardware configuration of the encapsulation-decapsulation device.

FIG. 5 illustrates an example of the hardware configuration of the encapsulation-decapsulation device 10. Referring to FIG. 5, the encapsulation-decapsulation device 10 includes a central processing unit (CPU) 51, a memory 52, another memory 53, and multiple network interface cards (NICs) 54 which are interconnected via a bus B. The encapsulation-decapsulation device 10 may employ the hardware configuration of a device that transfers layer-3 packets, such as a router or layer-3 switch.

The NIC 54, which is an example of a communication device or communication interface, may be connected to a local area network (LAN) or a packet network (IP network) via a communication line. The NIC 54 connected to an IP network includes electrical and electronic circuits and a memory which are for implementing a routing function (layer-3 processing) and a bridging function (layer-2 processing). One of the multiple NICs 54 is used as a line interface of the corresponding IPv4 network and another one of the multiple NICs 54 is used as a line interface of the corresponding IPv6 network. Also, the NIC 54 may be provided for each IPv4 network connected to the encapsulation-decapsulation device 10.

The memory 52 includes a nonvolatile storage medium (for example, a Read Only Memory (ROM) flash memory, Electrically Erasable Programmable Read Only Memory (EEPROM), or hard disk) on which programs to be executed by the CPU 51 and data used during execution of the programs are stored; and a volatile storage medium (for example, a Random Access Memory (RAM)) which is used as a work area of the CPU 51.

The memory 53 is used as a work area to perform processing on IP packets, such as creation of a packet or frame, extraction of an address, addition of a header, and removal of a header; or a buffer area for temporarily accumulating IP packets. Note that the memory 53 may be part of the memory 52. Each of the memories 52 and 53 is an example of a storage device.

The CPU 51 is an example of a processor (microprocessor) or controller. The processor (controller) includes a digital signal processor (DSP). The CPU 51 executes programs stored in the memory 52, thereby controlling the above-described backbone network address generation processing, IPv6 packet generation processing (IPv4-IPv6 conversion processing), IPv4-packet and IPv6-packet transfer processing, and other kinds of processing of the encapsulation-decapsulation device 10 (including each NIC 54).

Note that FIG. 5 illustrates an example in which the CPU 51 is employed as an example of the controller. However, following processing (functions) executed by the CPU 51 may be implemented by wired logic, which refers to a controller constituted by dedicated or general-purpose hardware (for example, at least one of an integrated circuit (IC), a large scale integration (LSI), an application specific integrated circuit (ASIC), and a programmable logic device (PLD, for example, a field programmable gate array (FPGA)).

<Functions of Encapsulation-Decapsulation Device>

Figure 6:
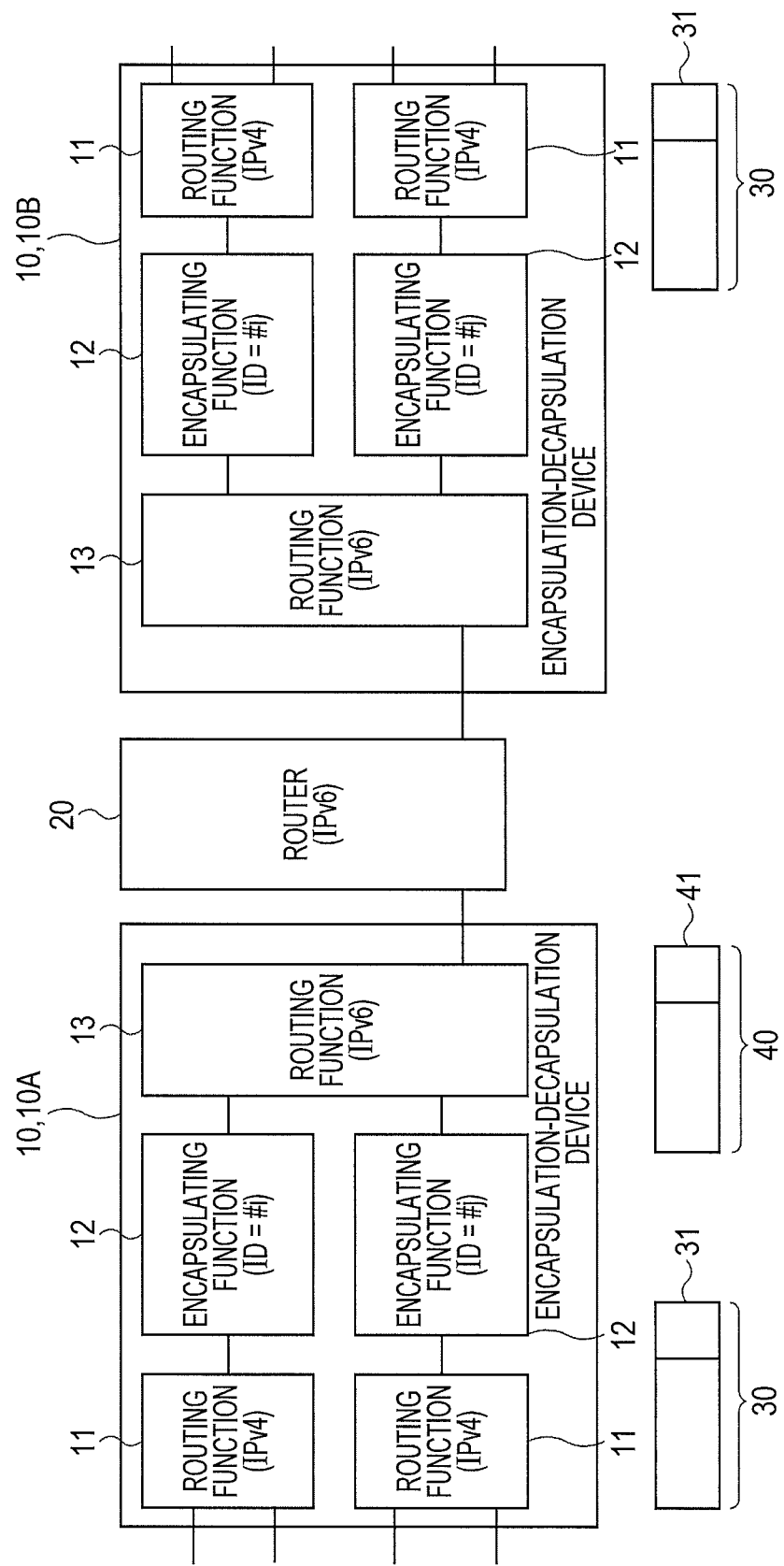
FIG. 6 is a diagram that schematically illustrates functions of the encapsulation-decapsulation device illustrated in FIG. 5.

FIG. 6 is a diagram that schematically illustrates functions of the encapsulation-decapsulation device 10 illustrated in FIG. 5 and also illustrates the network configuration. Note that FIG. 6 illustrates the configuration for the case where multiple different multiplexing IDs are used.

The encapsulation-decapsulation device 10 includes one or more routing functions (IPv4) 11 each accommodating a corresponding IPv4 network, and a routing function (IPv6) 13 connected to the backbone network (IPv6) N.

The routing function 11 includes an IPv4 routing table, and transfers an IPv4 packet received from the corresponding IPv4 network to an output line corresponding to the destination address. The routing function 11 is implemented by, for example, one of the NICs 54 (IPv4 NIC) illustrated in FIG. 5.

The routing function 11 may be provided for each IPv4 network. Different multiplexing IDs may be used for different IPv4 networks. The example of FIG. 6 illustrates multiplexing IDs i (for example, i="1") and j (for example, j="2").

The routing function 13 includes an IPv6 routing table, and transfers an IPv6 packet received from the corresponding IPv6 network (backbone network N) to an output line corresponding to the destination address. The routing function 13 is implemented by, for example, one of the NICs 54 (IPv6 NIC) illustrated in FIG. 5.

Each of the routing functions 11 is connected to the routing function 13 via a corresponding encapsulating function 12 which is provided for each multiplexing ID. The encapsulating function 12 performs the above-described backbone network address (IPv6) generation processing, IPv4 packet encapsulating processing, and IPv6 packet decapsulation processing (extraction of an IPv4 packet).

Figure 7:
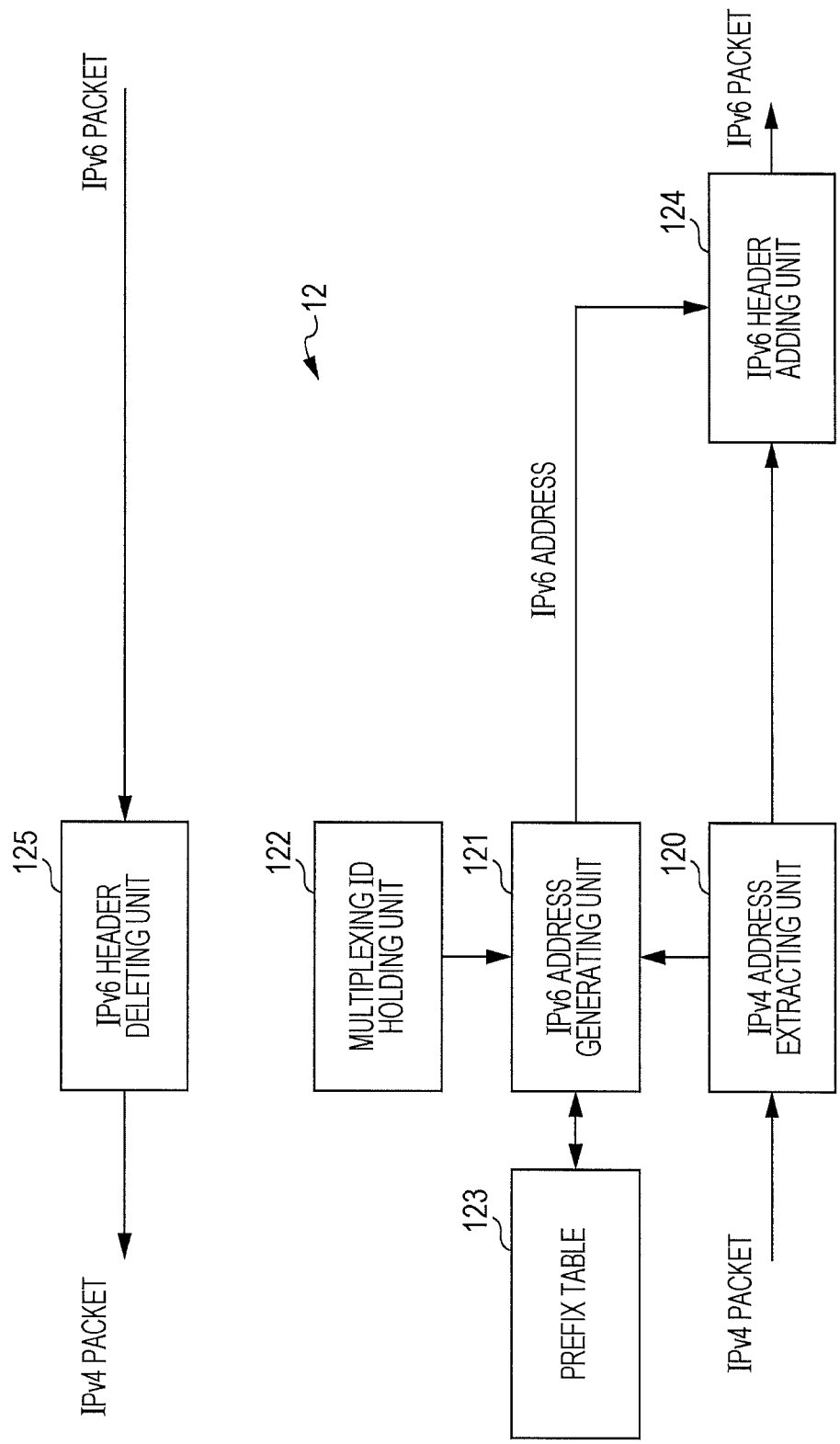
FIG. 7 is a block diagram that illustrates an example of details of an encapsulating function illustrated in FIG. 6.

FIG. 7 is a block diagram that illustrates an example of details of the encapsulating function 12 illustrated in FIG. 6. The encapsulating function 12 may include an IPv4 address extracting unit 120, an IPv6 address generating unit 121, a multiplexing ID holding unit 122, a prefix table 123, an IPv6 header adding unit 124, and an IPv6 header deleting unit 125.

The IPv4 address extracting unit 120 receives an IPv4 packet from the corresponding routing function 11, extracts a destination IPv4 address contained in the header of the IPv4 packet, and provides the extracted destination IPv4 address to the IPv6 address generating unit 121. The multiplexing ID holding unit 122 pre-stores multiplexing IDs. The prefix table 123 stores prefixes of respective IPv6 networks, the prefixes each corresponding to a combination of a multiplexing ID and an IPv4 address as illustrated in FIG. 1. Entries of the prefix table 123 may be stored through static setting. Alternatively, entry data acquired by the encapsulation-decapsulation device 10 by performing communication with another apparatus may be stored in the prefix table 123.

The IPv6 address generating unit 121 reads a multiplexing ID from the multiplexing ID holding unit 122, and reads a prefix corresponding to the combination of the read multiplexing ID and the destination IPv4 address acquired from the IPv4 address extracting unit 120, from the prefix table 123.

The IPv6 address generating unit 121 performs IPv6 address generation processing. Specifically, the IPv6 address generating unit 121 concatenates the read prefix, the multiplexing ID, and the destination IPv4 address so as to generate an IPv6 address, and supplies the IPv6 address to the IPv6 header adding unit 124.

The IPv6 header adding unit 124 assigns (adds) an IPv6 header containing the IPv6 address to the IPv4 packet provided by the IPv4 address extracting unit 120, thereby encapsulating the IPv4 packet. Then, the IPv6 header adding unit 124 outputs the encapsulated packet, that is, an IPv6 packet (IPv4-over-IPv6 packet).

The IPv6 header deleting unit 125 removes (deletes) the IPv6 header of an IPv6 packet received from the routing function 13, thereby obtaining an IPv4 packet which has been encapsulated (decapsulation). The resulting IPv4 packet is transferred to the corresponding routing function 11.

The IPv4 address extracting unit 120, the IPv6 address generating unit 121, the IPv6 header adding unit 124, and the IPv6 header deleting unit 125 are functions implemented as a result of the CPU 51 executing corresponding programs, for example. However, the IPv4 address extracting unit 120, the IPv6 address generating unit 121, the IPv6 header adding unit 124, and the IPv6 header deleting unit 125 may be implemented by wired logic using hardware such as electrical and electronic circuits. The multiplexing ID holding unit 122 and the prefix table 123 are implemented by respectively storing entries of multiplexing IDs and prefixes in the storage areas of the memory 52, for example.

<Example of Operation of Encapsulation-Decapsulation Device>

Now, an example of an operation performed by the encapsulation-decapsulation device 10 will be described. Referring back to FIG. 6, the following operation is performed in the case where the encapsulation-decapsulation device 10 illustrated at the left part of FIG. 6 is the encapsulation-decapsulation device 10A and the encapsulation-decapsulation device 10 illustrated at the right part of FIG. 6 is the encapsulation-decapsulation device 10B, for example.

In the encapsulation-decapsulation device 10A, the routing function 11 illustrated at the upper part of FIG. 6 receives an IPv4 packet 30 which is transmitted from the node A and is addressed to the node B. The IPv4 packet 30 contains an IPv4 header 31. The routing function 11 supplies the IPv4 packet 30 to the corresponding encapsulating function 12 (multiplexing ID "1") in accordance with the destination address of the IPv4 packet 30 and the IPv4 routing table.

The encapsulating function 12 encapsulates the IPv4 packet 30 with an IPv6 header containing an IPv6 address generated by the IPv6 address generating unit 121. At this time, the generated IPv6 address is set as the destination address in the IPv6 network (backbone network N) (the destination address indicates the address of the encapsulation-decapsulation device 10B). A resulting IPv6 packet 40 contains an IPv6 header 41 and a payload containing the IPv4 packet 30. The IPv6 packet 40 is supplied to the routing function 13.

The routing function 13 sends out the IPv6 packet 40 to the backbone network N in accordance with the destination IPv6 address and the IPv6 routing table. The IPv6 packet 40 arrives at the encapsulation-decapsulation device 10B directly or via a router 20, which is a relay device included in the backbone network N as illustrated in FIG. 6.

The router 20 includes an IPv6 routing table which stores IPv6 prefixes which are routing information advertised in advance by the stub networks X, Y, and Z (network addresses of the stub networks X, Y, and Z (IPv6)). Accordingly, upon receiving the IPv6 packet 40, the router 20 refers to the prefix of the IPv6 address contained in the IPv6 packet 40, and transfers the IPv6 packet 40 to the encapsulation-decapsulation device 10B in accordance with the IPv6 routing table stored therein.

In the encapsulation-decapsulation device 10B, the routing function 13 transfers the IPv6 packet 40 to the corresponding encapsulating function 12 (multiplexing ID="1") in accordance with the destination address of the IPv6 packet 40 and the IPv6 routing table. Specifically, if the destination IPv6 address of the IPv6 packet 40 indicates the address of the encapsulation-decapsulation device 10B stored in the IPv6 routing table, the IPv6 packet 40 is supplied to the encapsulating function 12 so as to terminate transfer of the IPv6 packet 40.

In the encapsulating function 12, the IPv6 header deleting unit 125 extracts the IPv4 packet 30, and transfers the IPv4 packet 30 to the corresponding routing function 11 (the upper part of FIG. 6). The routing function 11 sends out the IPv4 packet 30 to the IPv4 network Y1 in accordance with the destination address of the IPv4 packet 30 and the IPv4 routing table. In this way, the IPv4 packet 30 is received by the node B.

Conversely, in the case where an IPv4 packet which is transmitted from the node B and is addressed to the node A is received by the encapsulation-decapsulation device 10B, the encapsulation-decapsulation device 10B performs an operation similar to the above-described operation of the encapsulation-decapsulation device 10A and the encapsulation-decapsulation device 10A performs an operation similar to the above-described operation of the encapsulation-decapsulation device 10B. In this way, the IPv4 packet is sent out to the IPv4 network X1 and is received by the node A.

Figure 8:
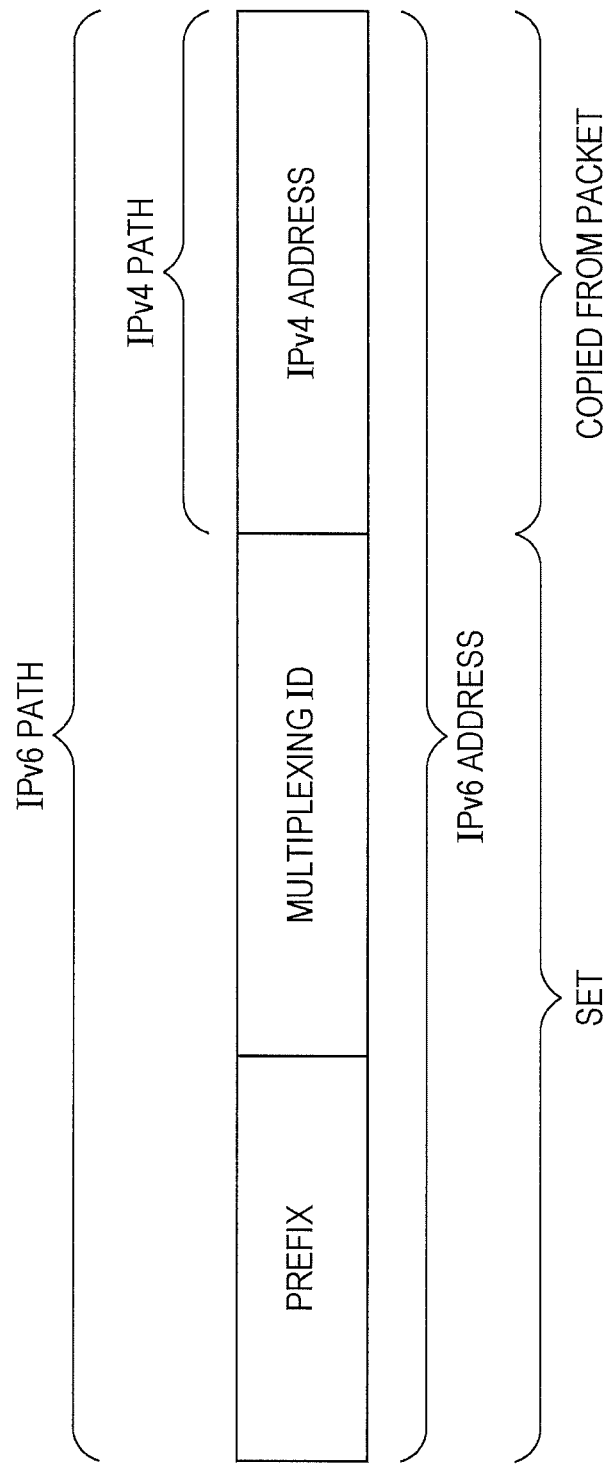
FIG. 8 is an explanatory diagram of a comparative example.

Advantageous effects of the first embodiment will be described in comparison with a comparative example illustrated in FIG. 8. FIG. 8 is an explanatory diagram of a comparative example. In the comparative example, an IPv6 address is generated from the prefix, the multiplexing ID, and the IPv4 address, as in the first embodiment. However, in the comparative example, the combination of the prefix and the multiplexing ID corresponding to the IPv4 address is pre-stored in an encapsulation-decapsulation device.

Upon receiving an IPv4 packet, the encapsulation-decapsulation device copies the destination address of the IPv4 packet and reads the prefix and the multiplexing ID which correspond to the destination address. Then, the encapsulation-decapsulation device concatenates the prefix, the multiplexing ID, and the destination address so as to generate an IPv6 address.

In the comparative example, prefixes pre-stored in the encapsulation-decapsulation device are prefixes that are set in order to transfer an IPv4 packet over the backbone network N and are different from prefixes of IPv6 networks (stub networks X, Y, and Z).

For this reason, when to-be-pre-stored prefixes are advertised and exchanged within the backbone network N, IPv6 prefixes of the stub networks X, Y, and Z and an IPv6 prefix for IPv4 transfer are advertized and exchanged. Consequently, the number of paths in the backbone network N increases. Such prefix management (advertizing and exchanging processing within the backbone network N) is complicated. Also, IPv6 packet transfer processing performed by the relay device within the backbone network N also is complicated (for example, because the number of entries of the routing table increases).

In contrast, in the first embodiment, an IPv6 address containing any one of the prefixes of the stub networks X, Y, and Z that are advertised and exchanged within the backbone network N is generated. Accordingly, an increase in the number of paths described above may be avoided, and whereby complication of prefix management and packet transfer processing may be avoided. Also, because the number of prefixes is finite, the prefixes may be utilized more efficiently.

<Modifications>

The first embodiment has described the example in which the address generation processing is performed by a router or layer-3 switch that functions as the encapsulation-decapsulation device 10, that is, the encapsulation-decapsulation device 10 including an address generator. However, the address generation processing may be performed in a device (for example, an address generator such as a server device) that is different from the relay device such as a router or layer-3 switch.

For example, the server device includes a storage device that stores the multiplexing ID holding unit 122 and the prefix table 123 illustrated in FIG. 7, and the IPv6 address generating unit 121 which is implemented as a result of a processor (CPU or DSP) executing a program or wired logic constituted by circuits.

A router or layer-3 switch serving as an encapsulation-decapsulation device transmits an IPv4 address contained in an IPv4 packet to the server device (to request the server device to provide an IPv6 address). The server device reads a corresponding prefix from the prefix table 123 by using the received IPv4 address and the multiplexing ID pre-stored (in the multiplexing ID holding unit 122), and functions as the IPv6 address generating unit 121 to generate an IPv6 address. Then, the server device returns the IPv6 address to the encapsulation-decapsulation device as a response to the request.

As described above, the encapsulation-decapsulation device 10 may be configured to make an inquiry about an IPv6 address to the server device which includes an address generator (functions as the address generator), instead of performing address generation processing. In this case, the encapsulation-decapsulation device 10 is able to make an inquiry upon acquiring an IPv4 address of the corresponding node. That is, the encapsulation-decapsulation device 10 may be prepared for reception of an IPv4 packet from the node A by acquiring an IPv6 address as pre-processing before the start of packet communication.

Also, each node of the first embodiment may be modified so as to include the encapsulating function 12 and the routing function 13 illustrated in FIG. 6. The encapsulating function 12 may be implemented, for example, by processing performed by a processor (CPU or DSP) included in the node or wired logic using circuits. The routing function 13 may be implemented by including an IPv6 NIC. In this way, a configuration in which a host (terminal device or server device) includes an address generator is also employable.

In this case, an IPv4 packet generated by a node may be converted into an IPv6 packet by the encapsulating function 12 of the node and the IPv6 packet may be transmitted to the backbone network N by the routing function 13. The foregoing modifications are applicable to second and third embodiments described later.

Second Embodiment

Figure 9:
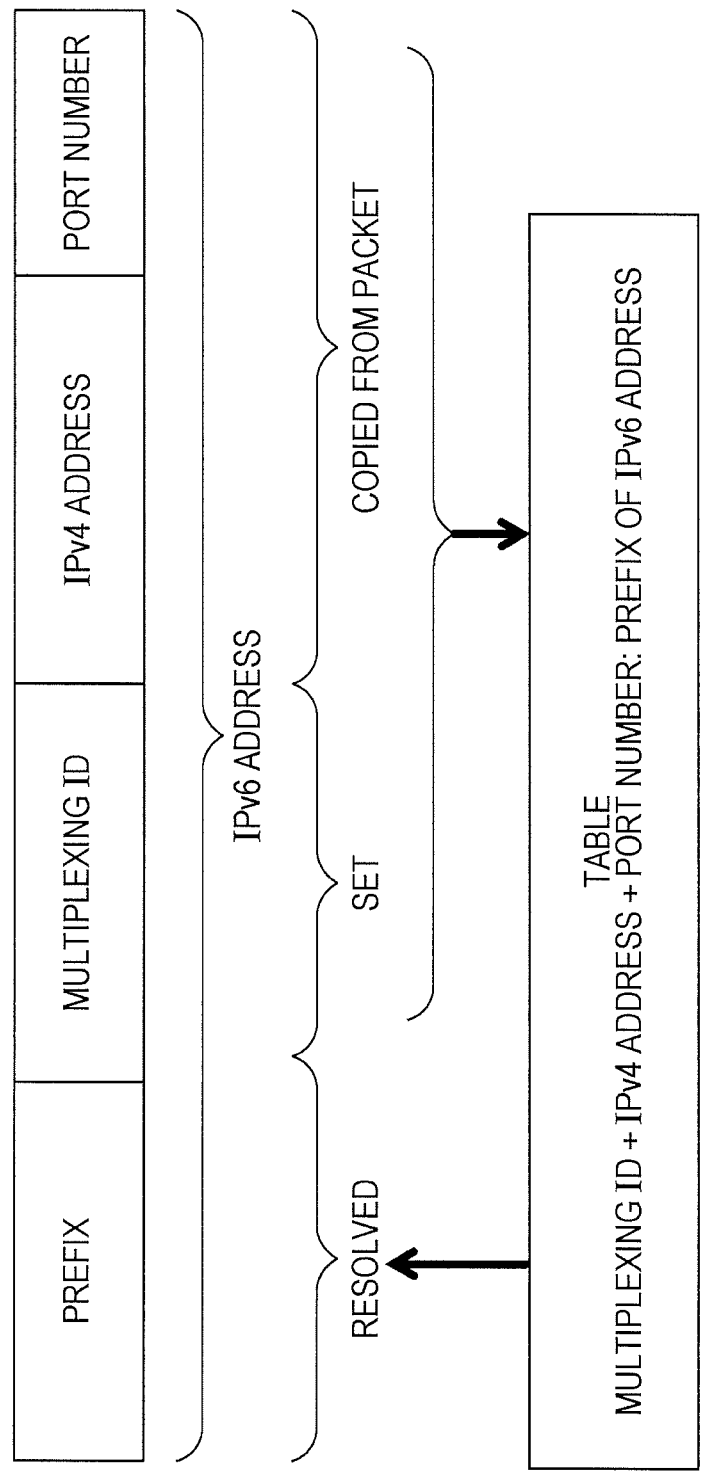
FIG. 9 is an explanatory diagram of a second embodiment.

Now, a second embodiment will be described. Because the second embodiment includes similarities to the first embodiment, a description of the similarities will be omitted and differences will be mainly described. FIG. 9 is an explanatory diagram of the second embodiment. In the second embodiment, the port number as well as the IPv4 address contained in the IPv4 packet are used to search for a prefix stored in a table.

Figure 10:
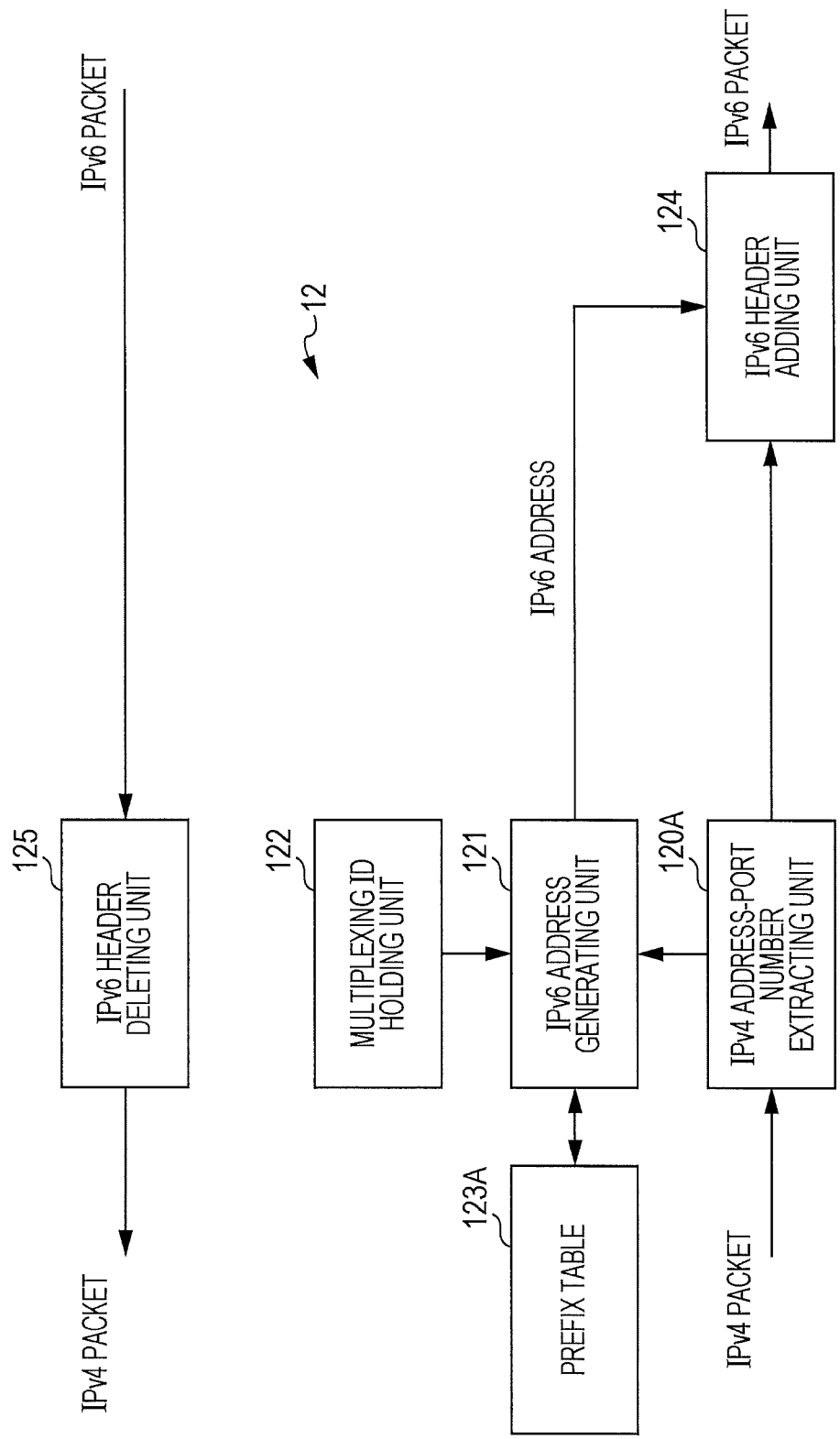
FIG. 10 illustrates an example of details of the encapsulating function according to the second embodiment.

Because the hardware configuration and functions of the encapsulation-decapsulation device 10 according to the second embodiment are substantially similar to those illustrated in FIGS. 6 and 7, a description thereof is omitted. FIG. 10 illustrates an example of the encapsulating function 12 according to the second embodiment.

A difference from the first embodiment (FIG. 7) is that an IPv4 address-port number extracting unit 120A which extracts the destination IPv4 address and the destination port number from an IPv4 packet is provided. Also, a prefix table 123A stores an IPv6 prefix (a prefix of an IPv6 network that is overlaid with a destination network (IPv4)) in association with the multiplexing ID, the IPv4 address, and the port number.

The IPv6 address generating unit 121 reads a prefix corresponding to the combination of the multiplexing ID, the IPv4 address, and the port number from the prefix table 123A, and concatenates the prefix, the multiplexing ID, the IPv4 address, and the port number so as to generate an IPv6 address.

Because the configuration and operation of the second embodiment are substantially similar to those of the first embodiment except for the above points, a description thereof is omitted. According to the second embodiment, advantageous effects similar to those of the first embodiment may be obtained.

Third Embodiment

Figure 11:
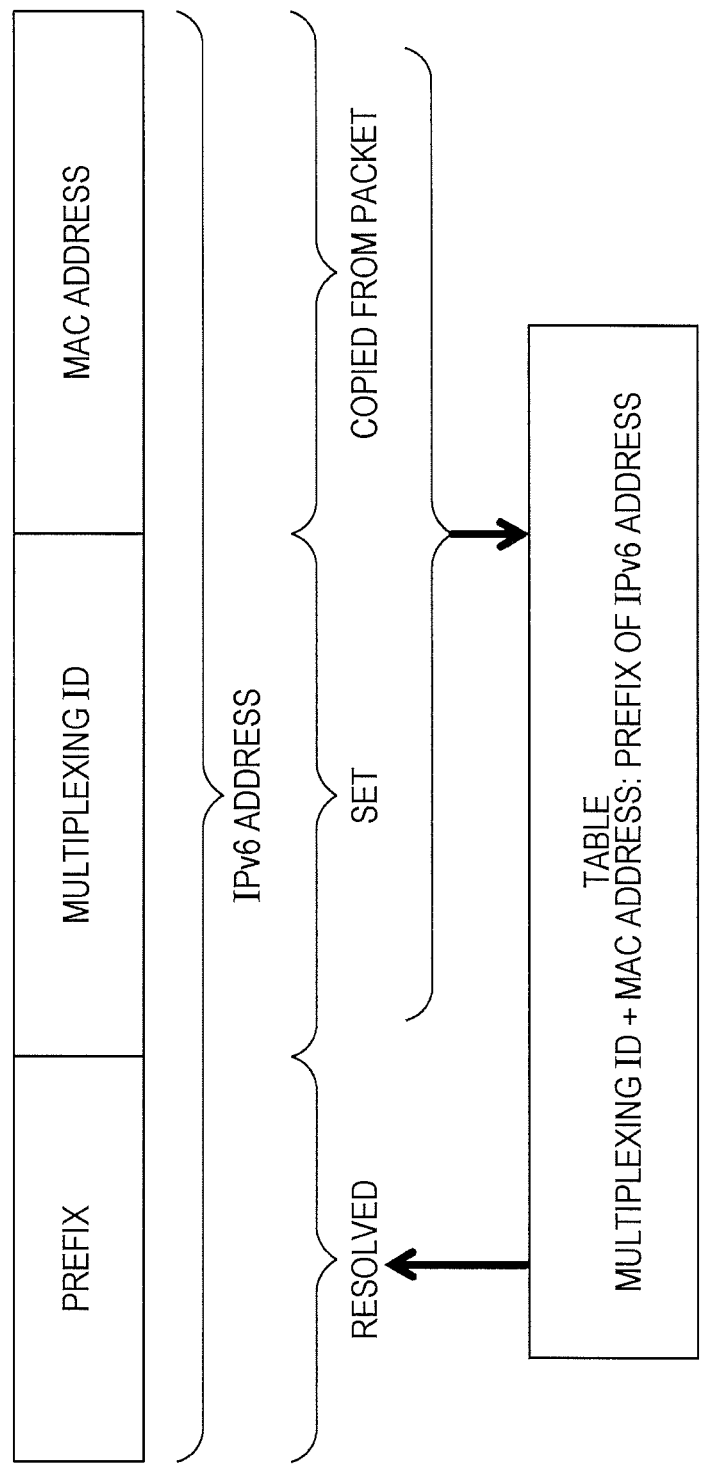
FIG. 11 is an explanatory diagram of a third embodiment.

Now, a third embodiment will be described. Because the third embodiment includes similarities to the first embodiment, a description of the similarities will be omitted and differences will be mainly described. FIG. 11 is an explanatory diagram of the third embodiment. In this third embodiment, as the first-protocol-family address, a media access control (MAC) address is used instead of an IPv4 address.

Accordingly, the following differs from the configuration of the network system illustrated in FIG. 1. Specifically, the nodes A, B, C, and C-1 illustrated in FIG. 1 are LAN terminals that support any of LAN protocols such as Ethernet, IEEE 802.3, IEEE 802.3+802.2 (LLC), and IEEE 802.3+802.2 (LLC+SNAP). Note that the term LAN may include a wireless LAN.

In this third embodiment, a network overlaid with a LAN may be an IPv4 network or an IPv6 network. That is, an IPv6 network is not necessarily overlaid with an IPv4 network. Each node transmits a frame based on a corresponding LAN protocol. A LAN frame contains a destination MAC address and a source MAC address. Hereinafter, the LAN frame may be referred to as a MAC frame. The LAN frame (MAC frame) is an example of a data block.

Also, unlike the first embodiment, each encapsulation-decapsulation device 10 is implemented using a layer-2 switch that supports layer 2 or a communication device, such as a switching hub, having a layer-2 supporting function and an IPv6 routing function.

The encapsulation-decapsulation device 10 according to the third embodiment may employ, for example, the hardware configuration illustrated in FIG. 5. In this case, the memory 53 is used for processing related to MAC frames instead of IPv4 packets.

Figure 12:
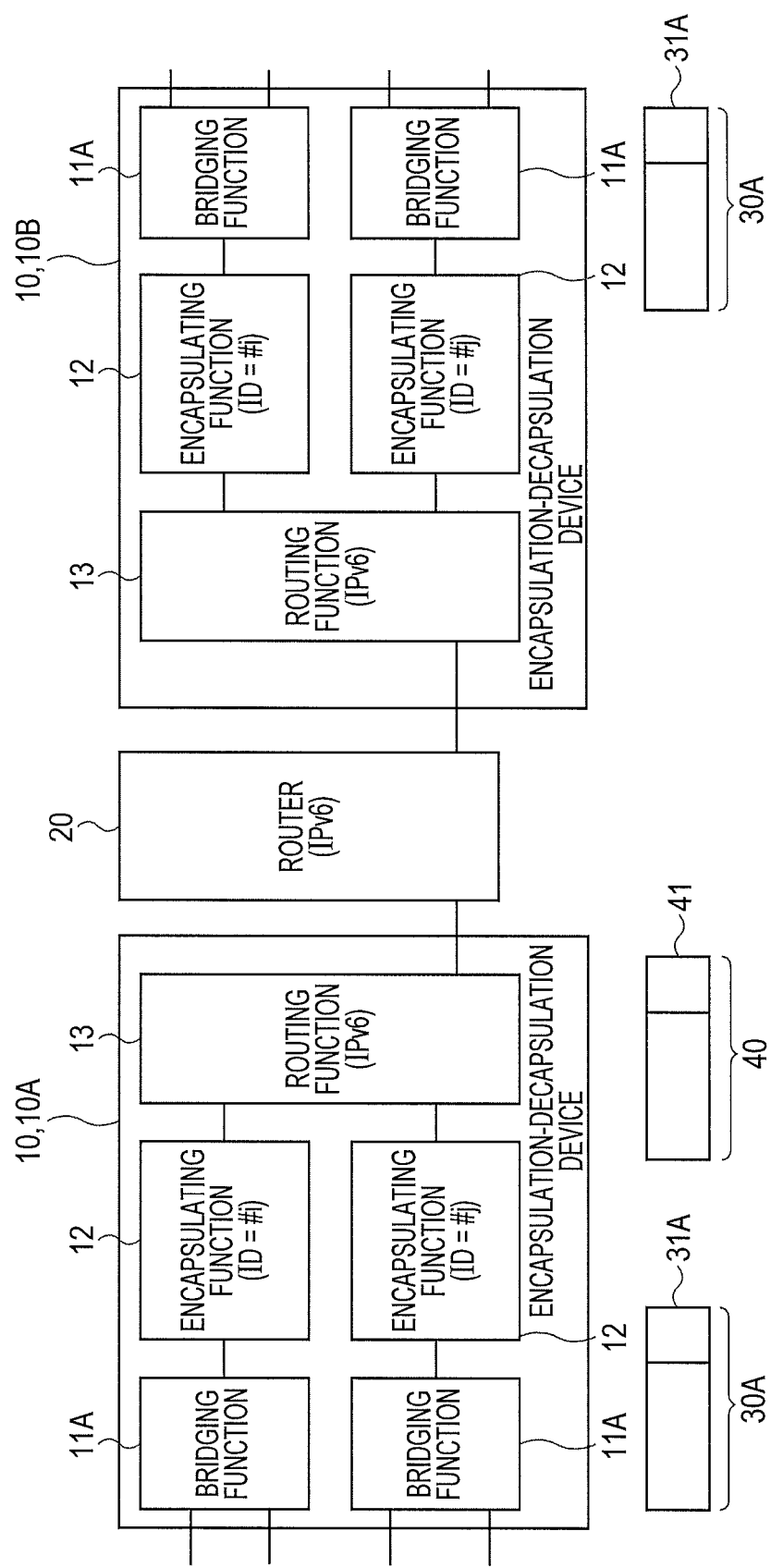
FIG. 12 is a diagram that schematically illustrates functions of the encapsulation-decapsulation device according to the third embodiment.

FIG. 12 is a diagram that schematically illustrates functions of the encapsulation-decapsulation device 10 according to the third embodiment. As illustrated in FIG. 12, the encapsulation-decapsulation device 10 according to the third embodiment includes bridging functions 11A for controlling MAC frame transfer processing, instead of the routing functions 11. The bridging function 11A may be implemented, for example, as a function of the NICs 54 (FIG. 5).

Figure 13:
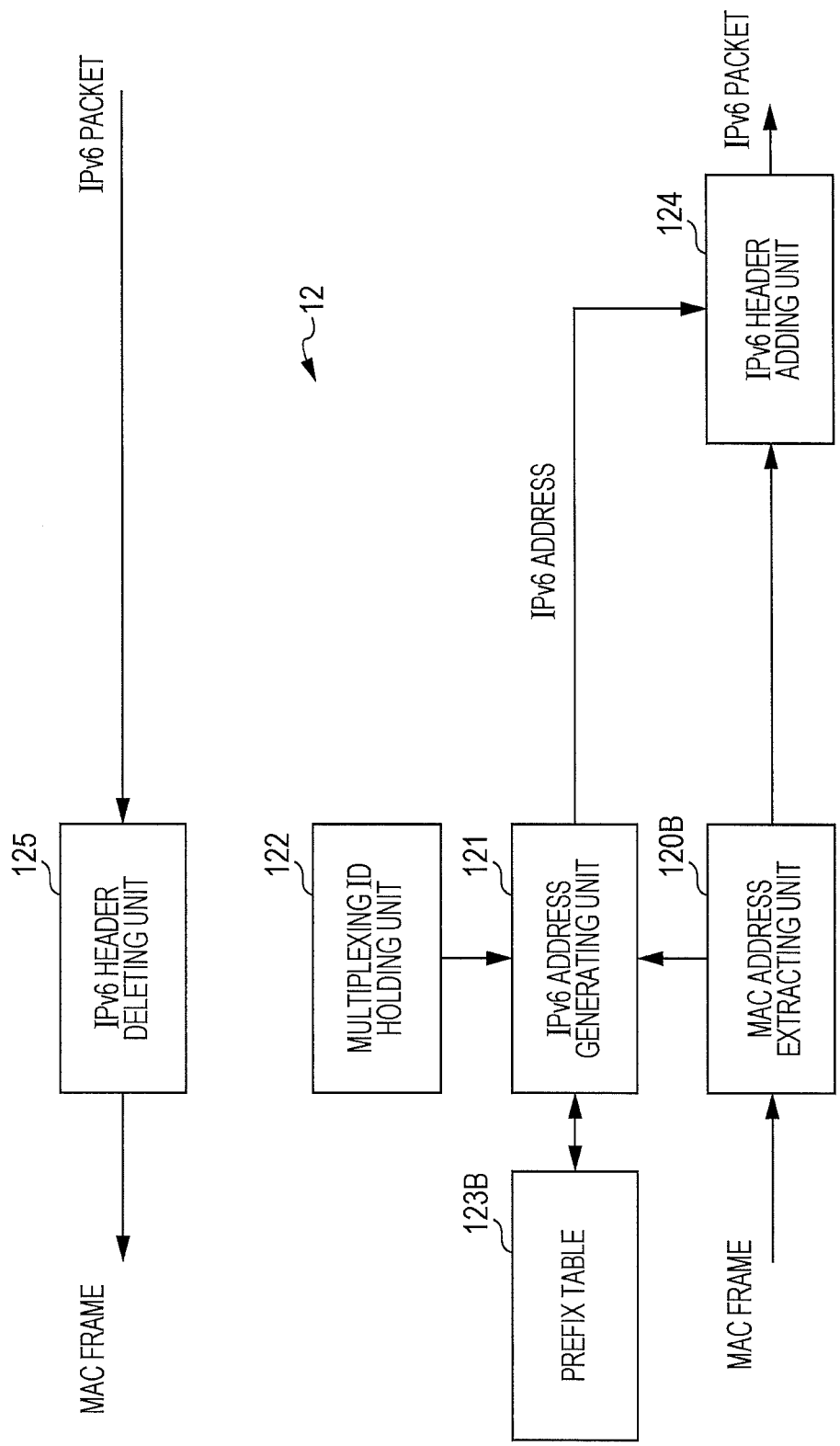
FIG. 13 illustrates an example of details of the encapsulating function according to the third embodiment.

FIG. 13 illustrates an example of details of the encapsulating function 12 according to the third embodiment. As illustrated in FIG. 13, the encapsulating function 12 includes a MAC address extracting unit 120B instead of the IPv4 address extracting unit 120. Also, a prefix table 123B is stored instead of the prefix table 123. The prefix table 123B stores an entry of a prefix (prefix of an IPv6 network overlaid with a destination network (LAN)) corresponding to the combination of the MAC address and the multiplexing ID.

A MAC frame 30A received from the bridging function 11A contains a MAC header 31A. The MAC address extracting unit 120B extracts a destination MAC address from the MAC header 31A and supplies the destination MAC address to the IPv6 address generating unit 121.

The IPv6 address generating unit 121 reads from the prefix table 123B a prefix corresponding to the combination of the multiplexing ID read from the multiplexing ID holding unit 122 and the destination MAC address, and generates an IPv6 address in which the prefix, the multiplexing ID, and the destination MAC address are concatenated. Note that, the IPv6 header deleting unit 125 deletes the IPv6 header from an IPv6 packet received from the routing function 13 so as to obtain a MAC frame.

In this way, in the third embodiment, a MAC frame that is transmitted from the node A and is addressed to the node B, for example, is encapsulated in an IPv6 packet by the encapsulating function 12 of the encapsulation-decapsulation device 10A and the IPv6 packet is sent out to the backbone network N from the routing function 13.

In the encapsulation-decapsulation device 10B, the routing function 13 receives the IPv6 packet. If the destination IPv6 address contained in the IPv6 packet is the address of the encapsulation-decapsulation device 10B stored in the IPv6 routing table, the IPv6 packet is transmitted to the corresponding encapsulating function 12 so as to terminate transfer of the IPv6 packet.

As a result, the MAC frame obtained as a result of decapsulation processing performed by the encapsulating function 12 (processing performed by the IPv6 header deleting unit 125) is transferred to the node B by the bridging function 11A. A MAC frame that is transmitted from the node B and is addressed to the node A is ultimately received by the node A by performing processing opposite to the above-described one.

According to the third embodiment, advantageous effects similar to those of the first embodiment may be obtained in an IP network (IPv4 or IPv6 network) that is overlaid with a LAN.

As described above, in contrast to the comparative example (FIG. 8), the first to third embodiments additionally use a table but advantageously omit the necessity of advertising new paths. The Internet is experiencing the expansion of the number of paths. However, the first to third embodiments may be implemented without any additional paths, and thus greatly contribute to smooth development of systems based on the Internet or IP networks.

The first embodiment employs the configuration in which, as an IPv4 address contained in an IPv4 packet, the destination IPv4 address is used to perform search and the prefix of the IPv6 network overlaid with the destination network (IPv4 network) corresponding to the destination IPv4 address is read. In order to ensure the reachability of an IPv6 packet from the transmission-side encapsulation-decapsulation device to the reception-side encapsulation-decapsulation device, the prefix of the IPv6 address at least matches the prefix of the stub network (IPv6) overlaid with the destination network (IPv4). Accordingly, the source IPv4 address may be used instead of the destination IPv4 address.

Also, in the second embodiment, instead of the destination port number, the source port number may be used as well as the source IPv4 address described above. Also, in the third embodiment, instead of the destination MAC address, the source MAC address may be used. In this case, a correspondence between the MAC address and the prefix differs from that of the third embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An address generator comprising:
    a storage device in which one or more second-protocol-family address prefixes based on a second protocol family are stored, the one or more second-protocol-family address prefixes each corresponding to a corresponding combination of at least a multiplexing identifier and a first-protocol-family address based on a first protocol family; and
    a controller configured to receive a data block, which includes both a first-protocol-family source address and a first-protocol-family destination address, to be transferred via a backbone network to a destination network which uses the first protocol family, configured to read, from the storage device, the second-protocol-family address prefix corresponding to a combination of at least the multiplexing identifier and the first-protocol-family destination address that is contained in the data block, the read second-protocol-family address prefix serving as an address prefix for a network that is overlaid with the destination network, and configured to generate a second-protocol-family address containing only the first-protocol-family destination address among the first-protocol-family source address and the first-protocol-family destination address, the multiplexing identifier, and the read second-protocol-family address prefix, the generated second-protocol-family address serving as a destination address within the backbone network.

2. The address generator according to claim 1, wherein the controller is configured to read, from the storage device, a second-protocol-family address prefix corresponding to a combination of the first-protocol-family destination address and a port number that are contained in the data block and the multiplexing identifier, and configured to generate a second-protocol-family address containing the first-protocol-family destination address, the port number, the multiplexing identifier, and the read second-protocol-family address prefix.

3. The address generator according to claim 1, wherein the first-protocol-family address is an Internet Protocol version 4 address and the second-protocol-family address is an Internet Protocol version 6 address.

4. The address generator according to claim 1, wherein the first-protocol-family address is a media access control address and the second-protocol-family address is an Internet Protocol version 6 address.

5. The address generator according to claim 2, wherein the first-protocol-family address is an Internet Protocol version 4 address and the second-protocol-family address is an Internet Protocol version 6 address.

6. An address generation method comprising:
    reading, from a storage device, a second-protocol-family address prefix corresponding to a combination of at least a multiplexing identifier and a first-protocol-family destination address that is contained in a data block to be transferred via a backbone network to a destination network which uses a first protocol family, the data block including both a first-protocol-family source address and the first-protocol-family destination address, the read second-protocol-family address prefix serving as an address prefix for a network that is overlaid with the destination network; and
    generating a second-protocol-family address containing only the first-protocol-family destination address among the first-protocol-family source address and the first-protocol-family destination address, the multiplexing identifier, and the read second-protocol-family address prefix, the generated second-protocol-family address serving as a destination address within the backbone network.

7. The address generation method according to claim 6, wherein
    the reading includes reading, from the storage device, a second-protocol-family address prefix corresponding to a combination of the first-protocol-family destination address and a port number that are contained in the data block and the multiplexing identifier, and
    the generating includes generating a second-protocol-family address containing the first-protocol-family destination address, the port number, the multiplexing identifier, and the read second-protocol-family address prefix.

8. An encapsulation-decapsulation device disposed, in a network system in which a plurality of stub networks each of which uses a first protocol family are connected to one another via a backbone network which uses a second protocol family, at a boundary between each of the plurality of stub networks and the backbone network, the encapsulation-decapsulation device comprising:
    a storage device in which one or more second-protocol-family address prefixes based on the second protocol family are stored, the one or more second-protocol-family address prefixes each corresponding to a corresponding combination of at least a multiplexing identifier and a first-protocol-family address based on the first protocol family; and
    a controller configured to, upon receiving, from a source stub network to which the encapsulation-decapsulation device is connected among the plurality of sub networks, a data block addressed to a destination stub network, the data block including both a first-protocol-family source address and a first-protocol-family destination address, read, from the storage device, a second-protocol-family address prefix corresponding to a combination of at least a multiplexing identifier and a first-protocol-family destination address contained in the data block, the read second-protocol-family prefix serving as an address prefix for a network that is overlaid with the destination stub network, encapsulate the data block with a header including a second-protocol-family address which contains only the first-protocol-family destination address among the first-protocol-family source address and the first-protocol-family destination address, the multiplexing ID, and the read second-protocol-family address prefix, and transmit the encapsulated data block to the backbone network.

* * * * *